United States Patent [19]
Van Loenen et al.

[11] Patent Number: 5,644,183
[45] Date of Patent: Jul. 1, 1997

[54] FLAT ELECTRIC MOTOR HAVING A STATOR FORMED FROM A FOLDED STACK OF FLAT ELECTRICALLY INSULATING SUPPORT ELEMENTS WITH PRINTED CONDUCTOR WINDINGS

[75] Inventors: Evert J. Van Loenen; Franciscus M.A.M. Van Gaal, both of Eindhoven, Netherlands

[73] Assignee: U.S. Philips Corporation, New York, N.Y.

[21] Appl. No.: 490,477

[22] Filed: Jun. 14, 1995

[30]  Foreign Application Priority Data

Jun. 15, 1994 [EP] European Pat. Off. .............. 94201716

[51] Int. Cl.⁶ .............................. H02K 4/06; H02K 3/32
[52] U.S. Cl. ..................................... 310/268; 310/DIG. 6
[58] Field of Search ..................................... 310/268, 166, 310/168, DIG. 6, 254

[56]  References Cited

U.S. PATENT DOCUMENTS

| | | | |
|---|---|---|---|
| 3,737,697 | 6/1973 | Kitamori et al. | 310/207 |
| 4,336,475 | 6/1982 | Morinaga et al. | 310/198 |
| 4,340,833 | 7/1982 | Sudo et al. | 310/268 |
| 4,804,574 | 2/1989 | Osawa et al. | 428/209 |

FOREIGN PATENT DOCUMENTS

| | | |
|---|---|---|
| 57-83135 | 5/1982 | Japan . |
| 665303 | 4/1988 | Switzerland . |

OTHER PUBLICATIONS

Patent Abstracts of Japan, vol. 6, No. 164, E–127, abstract of JP,A,57–83135 (Hitachi Seisakusho K.K.) 24 May 1982.
Patent Abstracts of Japan, vol. 9, No. 23, E–293, abstract of JP,A 59–169343 (Hitachi Seisakusho K.K.), 25 Sep. 1984.
Patent Abstracts of Japan, vol. 11, No. 240, E–529, abstract of JP,A,62–53147 (Hokuto Seisakusho K.K.) 7 Mar. 1987.

Primary Examiner—Steven L. Stephan
Assistant Examiner—Christopher Cuneo
Attorney, Agent, or Firm—Edward Blocker

[57] ABSTRACT

A flat electric motor comprises a rotor with a flat, permanent magnetic disc which is rotatable about an axis of rotation, and an electromagnetic stator with a stack of flat, electrically insulating supporting elements having first and second principal surfaces on which patterns of conductor tracks are provided such that there is formed a number of windings consisting of first and second coils arranged in a ring about the axis of rotation and which are formed by spirally extending conductor tracks on the first and the second principal surface of each supporting element. The coils which form part of one winding are electrically connected in series via connection tracks which a part of the conductor tracks, interconnections which extend between the first and second principal surfaces, and connection elements which connect connection tracks on different supporting elements of the stack to one another. The supporting elements of each stack are formed by successive parts of a support in the form of a strip of an electrically insulating foil, between each pair of successive supporting elements there is a folding line which extends transversely of the local longitudinal direction of the strip. In order to form the stack of supporting elements, the strip is folded along the folding lines and the connection elements are formed by connection tracks which cross the folding lines. Very reliable connection elements are thus formed at hardly any additional cost.

8 Claims, 6 Drawing Sheets

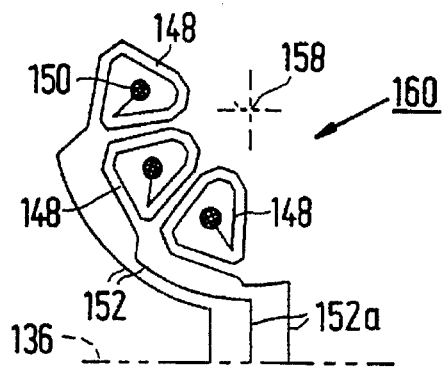
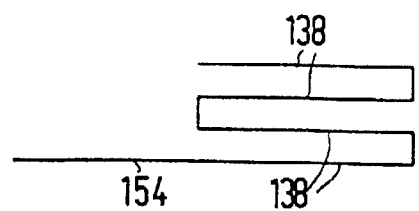
FIG.6A                FIG.6B
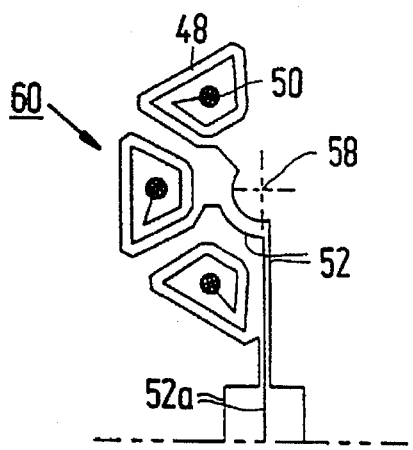
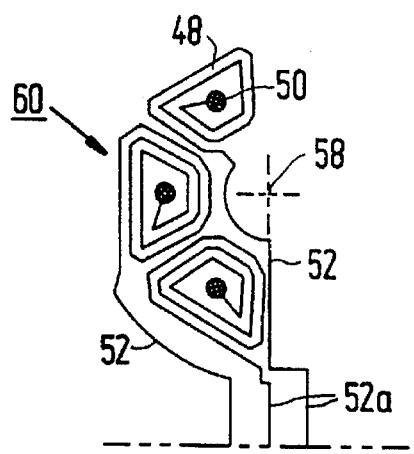
FIG.7A                FIG.7B
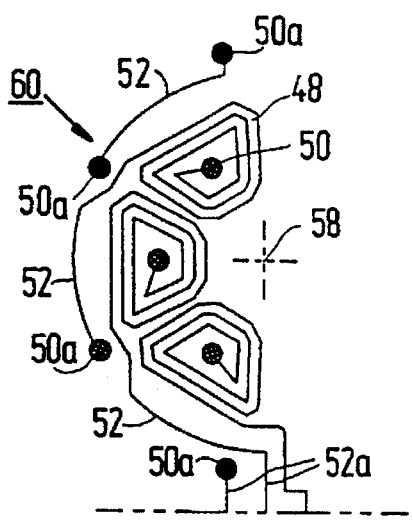
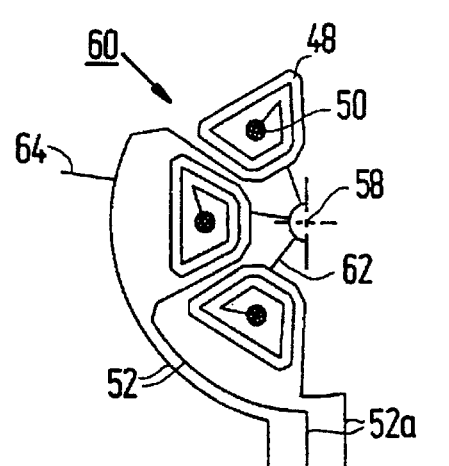
FIG.8A                FIG.8B

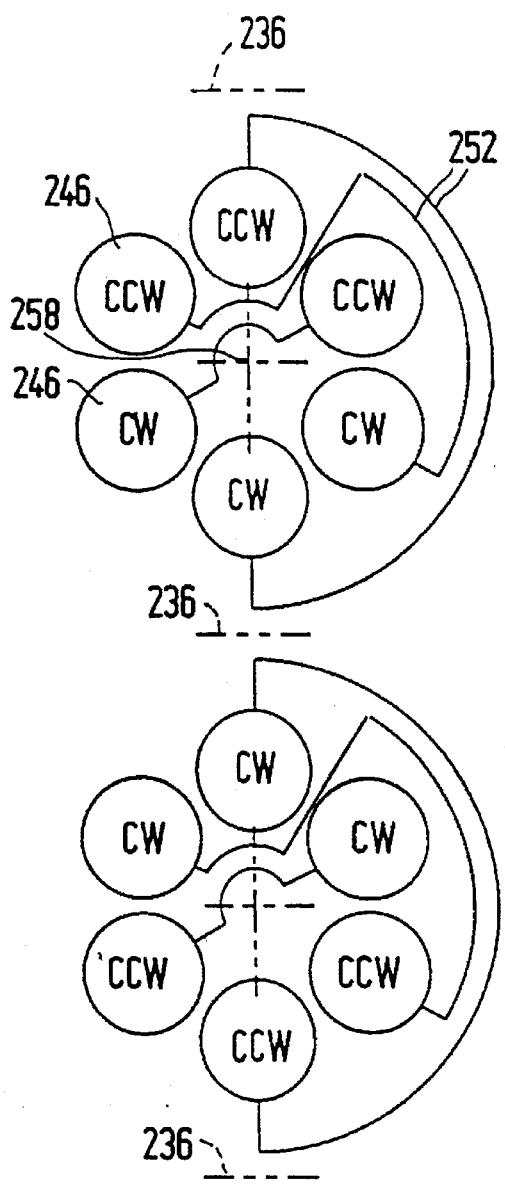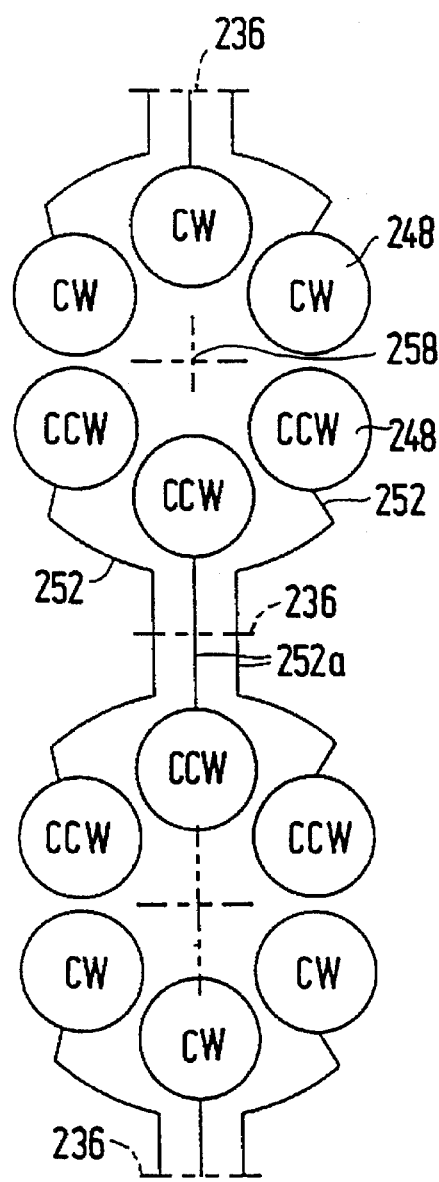
FIG.9A
FIG.9B

FLAT ELECTRIC MOTOR HAVING A STATOR FORMED FROM A FOLDED STACK OF FLAT ELECTRICALLY INSULATING SUPPORT ELEMENTS WITH PRINTED CONDUCTOR WINDINGS

BACKGROUND OF THE INVENTION

1. Field of the Invention

The invention relates to a flat electric motor, comprising a rotor with at least one flat, permanent magnetic disc which is rotatable about an axis of rotation extending perpendicularly to the plane of the disc, and an electromagnetic stator with at least one stack of flat, electrically insulating supporting elements having first and second principal surfaces on which patterns of conductor tracks are provided in such a manner that there is formed a number of windings consisting of first and second coils which are arranged in a ring about the axis of rotation and which are formed by spirally extending conductor tracks on the first and the second principal surface of each supporting element. The coils which form part of a given winding and electrically connected in series via a connection system comprising connection tracks which form part of the conductor tracks, interconnections which extend between the first and second principal surfaces, and connection elements which connect connection tracks on different supporting elements of the stack to one another. The windings of the stack are distributed between a number of phases, each of which comprises one winding, the coils of which are situated directly one over the other in the stack belonging to the same phase.

2. Description of the Related Art

An electric motor of this kind is known from Swiss Patent CH-A-665 303, published Apr. 29, 1988 Generally speaking, the stator comprises three or more supporting elements so that a comparatively large number of connection elements is required to connect the connection tracks on the various supporting elements to one another. The connection elements in the known electric motor are formed by pressing parts of the connection tracks onto one another. Contaminations such as oxide layers or dust could then occur between the connection tracks thus pressed together. Consequently, an electric connection thus formed is not always reliable and in some cases, therefore, it will be necessary to use different connection techniques for the connection elements, for example joints formed by soldering or by means of an electrically conductive glue. The operations then involved are time-consuming and expensive.

SUMMARY OF THE INVENTION

It is an object of the invention to improve an electric motor of the kind set forth in such a manner that the connection elements are extremely reliable and can be provided substantially at no additional cost. To this end, the electric motor in accordance with the invention is characterized in that the supporting elements of each stack are formed by successive parts of a support in the form of a strip of an electrically insulating foil, a folding line being provided transversely of the local longitudinal direction of the strip between each pair of successive supporting elements, which strip is folded along the folding lines so as to form the stack of supporting elements, and that the connection elements are formed by connection tracks which cross the folding lines. Because the connection elements form part of the system of conductor tracks, an extremely reliable electrical connection is ensured at no additional cost. Moreover, the stack may now comprise an unlimited number of supporting elements whereas when loose supporting elements are stacked, this number is limited, for example by a limited penetration depth upon soldering and an increasing risk of high-ohmic contacts upon stacking or gluing. Further advantages reside in the fact that the electric resistance of each phase can be measured prior to stacking and that less area is required on the photomask than when loose supporting elements are used.

An embodiment of the electric motor in accordance with the invention is characterized in that the conductor tracks situated on the same principal surface of the support extend in a pattern which is the same for all supporting elements. The support is preferably made by means of a technique customarily used for the manufacture of printed circuit boards (PCBs). The electrically insulating support is then covered by an electrically conductive layer (for example, copper) wherefrom the conductor tracks are formed by selective etching by means of a mask. In said embodiment the pattern of conductor tracks recurs for each support, so that the mask for a principal surface can be simply and inexpensively manufactured. In a further embodiment in which the patterns of the conductor tracks on both principal surfaces of each supporting element are identical, substantially the same mask design can be used for the two principal surfaces.

A further preferred embodiment of the electric motor in accordance with the invention is characterized in that the pattern of conductor tracks on each of the principal surfaces of each supporting element is composed of a basic pattern comprising a number of coils which corresponds to the number of phases, each coil being connected to a connection track and a part of a connection element, which basic pattern occurs N times on the principal surface, where N is the number of coils per phase, and each basic pattern extends through 1/N part of the circle circumference and is rotated about the axis of rotation through an angle of 360°/N relative to the adjacent basic pattern. In this embodiment the mask design is very simple. The designer need draw the basic pattern only once, after which the complete mask can be formed by a number of rotations and translations.

A further embodiment of the electric motor in accordance with the invention is characterized in that in the basic pattern the connection track of at least one of the coils consists of at least one first part which is situated on the same principal surface as the relevant coil and at least one second part which is situated on the other principal surface, and that the first and second parts are interconnected by means of additional interconnections. This embodiment offers the advantage that the two principal surfaces of the support can be optimally used, so that two conductor tracks do not extend adjacent one another but one underneath the other. Consequently, the number of conductor tracks extending outside or inside the ring of coils can be minimized. However, the number of interconnections between the principal surfaces must then be larger than in other embodiments.

A further embodiment of the electric motor in accordance with the invention is characterized in that the connection track of at least one of the coils extends as a curved line having a direction of curvature which opposes that of the conductor tracks in the relevant coil. This embodiment offers the major advantage that the coil has one tangentially extending conductor track less than the other embodiments. Consequently, the electric resistance per coil is lower and less space is required on the support.

BRIEF DESCRIPTION OF THE DRAWINGS

These and other aspects of the invention will be described in detail hereinafter with reference to the drawings.

FIGS. 6a and 6b show, analogously to the FIGS. 4a and 4b, a basic pattern for the conductor tracks of the support shown in FIG. 5 and a stack of supporting elements obtained after the folding of this support, FIGS. 7a and 7b show two basic patterns which can be used instead of the basic pattern shown in FIG. 4a, FIGS. 8a and 8b show two further basic patterns which can be used instead of the basic pattern shown in FIG. 4a, and FIGS. 9a and 9b show diagrammatically the conductor patterns on the principal surfaces of a support for a third embodiment of an electric motor in accordance with the invention.

DESCRIPTION OF THE PREFERRED EMBODIMENTS

Figure 1:
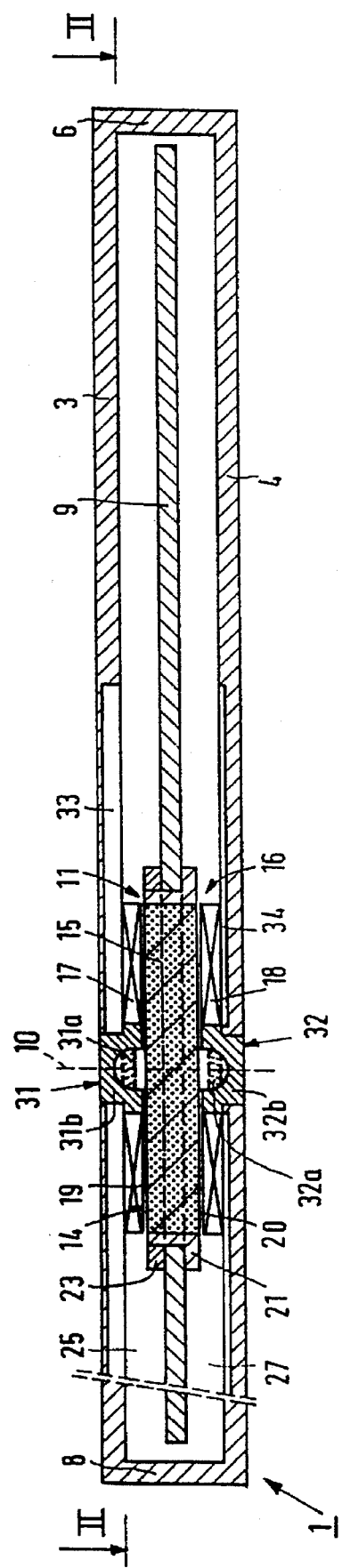
FIG. 1 is a diagrammatic longitudinal sectional view of a data storage unit comprising an electric motor in accordance with the invention.
Figure 2:
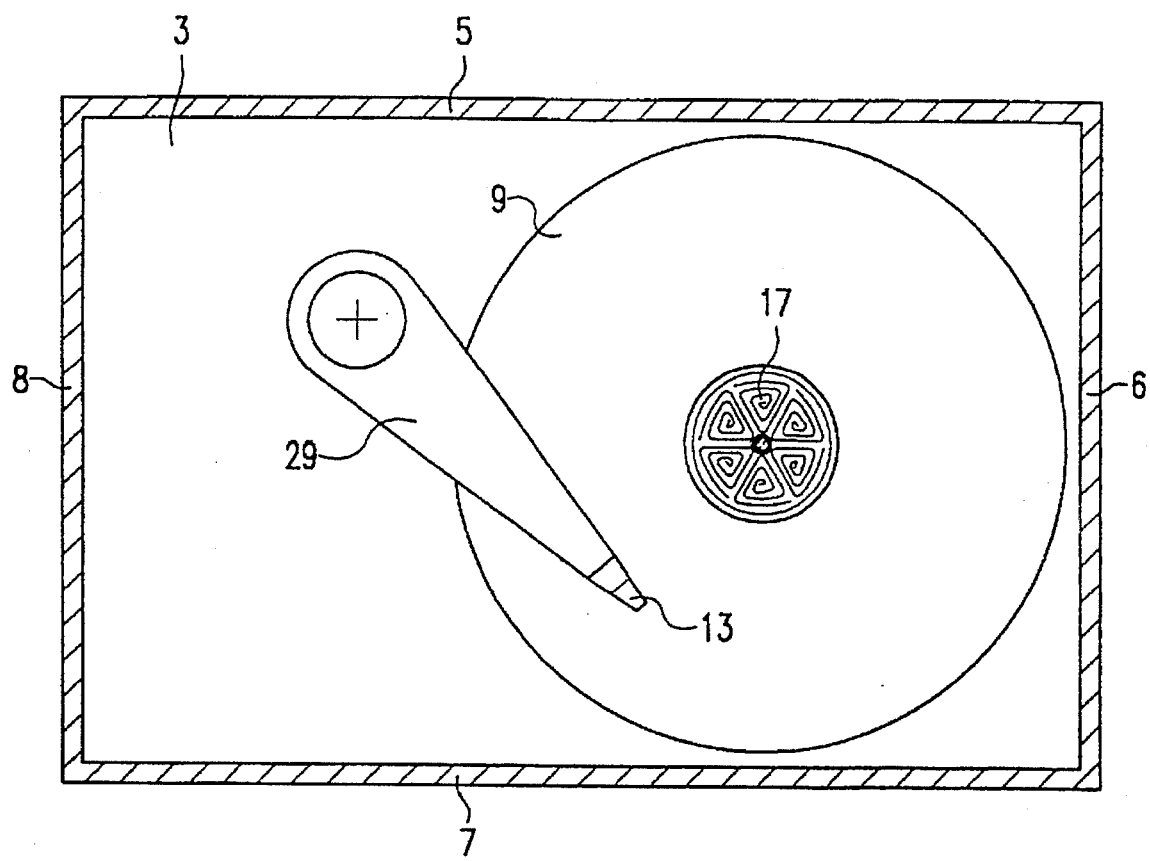
FIG. 2 is a sectional view taken along the line II—II in FIG. 1, FIGS. 3a and 3b show two principal surfaces of a support for a first embodiment of an electric motor in accordance with the invention, together with a diagrammatic representation of conductor tracks present on the principal surfaces.

The data storage unit shown in the FIGS. 1 and 2 comprises a housing 1 with two parallel main walls 3 and 4 and four side walls 5, 6, 7 and 8 which interconnect the main walls. The housing 1 constitutes a substantially closed cassette in which there are accommodated an information disc 9 which is rotatable about an axis of rotation 10, an electric drive unit 11 for driving the information disc in a rotating fashion, and a scanning device for scanning the information disc.

The drive unit 11 is constructed as an electric motor of the axial-field type, provided with a rotor 14 with a flat, permanently magnetized disc-shaped rotor magnet 15, preferably a high-energy magnet consisting, for example of Nd-Fe-B. The stator 16 consists of two parts 17 and 18. The rotor magnet 15, being rotatable about the same axis of rotation 10 as the information disc 9, is axially magnetized and provided with a number of magnetic poles opposite each of the stator parts 17 and 18. The stator parts 17 and 18 are provided on the main walls 3 and 4, respectively, and cooperate with the rotor magnet 15 via an air gap 19, 20, respectively.

In the present example the information disc 9 is a so-called hard magnetic disc with a support, on two sides of which there is provided a magnetic layer in which information is stored or can be stored. The information disc 9 is provided with a central aperture wherethrough the rotor magnet 15 projects. Around the rotor magnet 15 there is arranged an annular member 21, for example of iron or another soft-magnetic material, on which the information is centred and secured by means of a ring 23. The soft-magnetic member 21 shields the information disc 9 from stray flux from the drive unit 11.

In the present example the scanning device comprises a scanning unit 13 on each side of the information disc 9. Each scanning unit 13 is situated in a space 25 or 27 between the information disc 9 and one of the main walls 3, 4, and comprises a magnetic head for the writing and/or reading of information which is arranged on a pivot arm 29.

The data storage unit comprises a bearing for journalling the rotor 14, and the information disc 9 secured thereto, relative to the housing 1. The bearing comprises two hydrodynamic spiral groove bearings 31 and 32, each of which comprises a bearing portion 31a, 32a, respectively, which is shaped as a segment of sphere. The bearing portions 31a and 32a both have a smooth bearing surface and are secured to the rotor 14. The bearing portions 31b and 32b both are provided with a bearing surface with a groove pattern and are secured to the main walls 3 and 4, respectively. As a result of the presence of the groove patterns, during rotation of the rotor 14 a pressure is built up in a medium, such as grease or oil, present between the bearing surfaces of each of the spiral groove bearings 31 and 32.

Figure 3A:
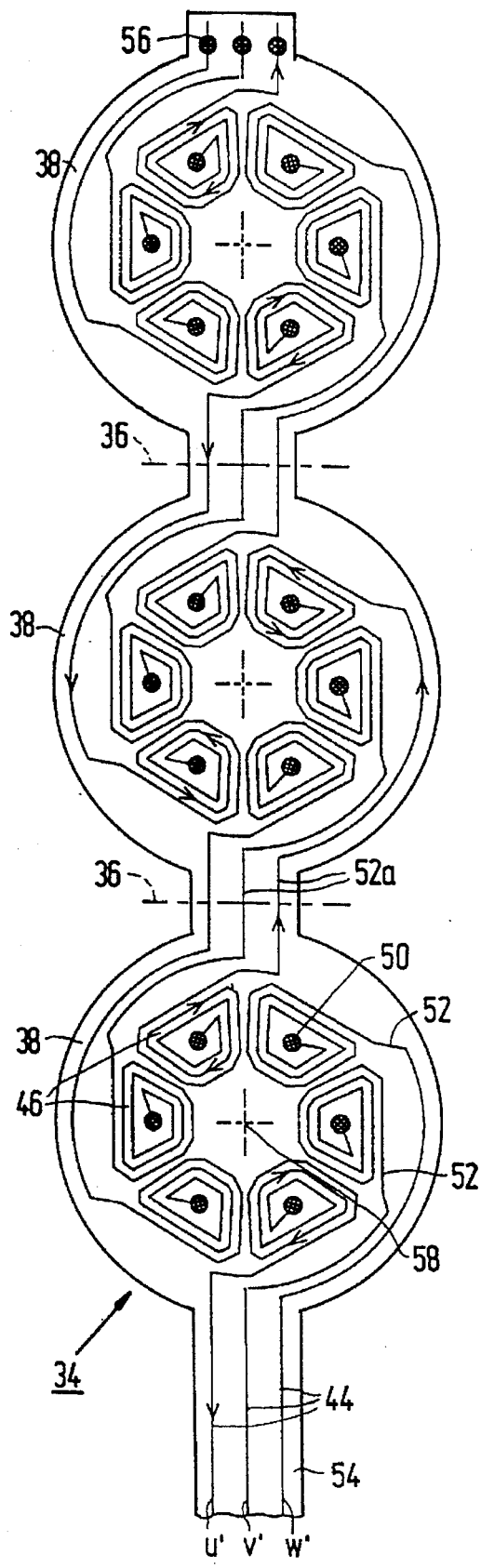
Figure 3B:
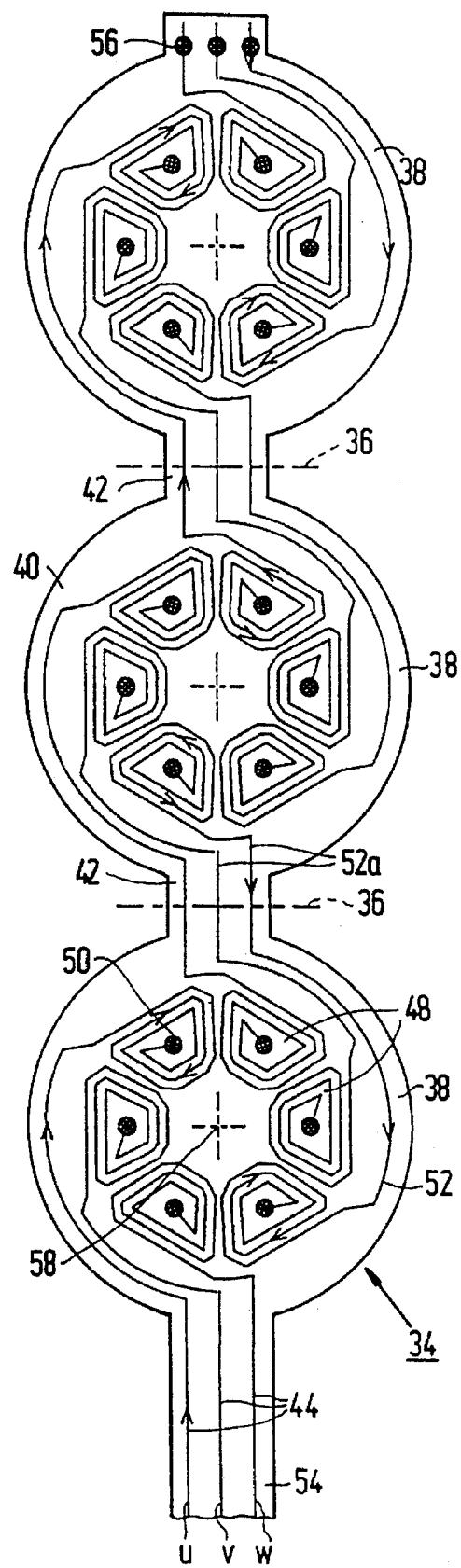

Each part 17 or 18 of the stator 16 comprises a number of flat, electrically insulating supporting elements with conductor tracks which are stacked so as to form the relevant stator part. FIG. 3 shows a first embodiment of a support 34 comprising the supporting elements of a stator part 17 or 18. The support 34 is formed as a strip of electrically insulating foil, for example polyamide, which is subdivided into a number (three in the present example) of supporting elements 38 by folding lines 36 extending transversely of the longitudinal direction of the strip. Each supporting element 38 of the present embodiment consists of an approximately circular central part 40 and two narrower, diametrically oppositely situated connection parts 42, the facing connection parts of adjoining supporting elements. changing over one into the other. In the Figure the support 34 is situated in the plane of drawing, FIG. 3A shows the downwards facing first principal surface of the support and FIG. 3B the upwards facing second principal surface. The first principal surface is thus shown as viewed from the second principal surface, i.e. viewed through the support. On the first and the second principal surface of the support 34 there are provided patterns of electrically conductive tracks, for example by selective etching of a layer of electrically conductive material, such as copper, on the principal surfaces. Such operations are customary in the manufacture of printed circuitboards (PCBs). The Figures show the conductor tracks 44 diagrammatically as thin lines. In reality, of course, they have a finite width. The conductor tracks 44 form first coils 46 on the first principal surface and second coils 48 on the second principal surface. In the coils the conductor tracks 44 extend spirally and terminate at the centre of the spiral at an interconnection 50 in the form of an opening with metallized walls which extends between the first and the second principal surface and constitutes an electrical connection between the first and second coils 46, 48 oppositely situated on both sides of the support 34. With the conductor tracks 44 there are also associated connection tracks 52 which serve to connect coils 46 or 48 situated on the same principal surface of the support 34. The connection tracks 52 comprise parts 52a which cross the folding lines 36 and constitute connection elements which connect the connection tracks on various supporting elements 38 to one another.

The coils 48, interconnected via the connection tracks 52, the connection elements 52a and the interconnections 50, together constitute a winding. The embodiment shown includes three of such windings. The stator 16 is in this case suitable for a three-phase motor, each phase comprising one of the three windings. The phases can be electrically connected by connecting the conductor tracks 44 on a connection part 54 at a first end of the support 34 to a suitable supply source (not shown). Near the oppositely situated second end of the support 34 the corresponding connection tracks 52 on the first and the second principal surface are interconnected by way of further interconnections 56. For one of the phases the current path is indicated by means of arrows inserted in the conductor tracks 44. Starting from a point which is denoted by the reference u and which is situated on a conductor track 44, connected to a first terminal of the supply source and situated on the second principal surface of the connection part 54, the current flows to the second coil 48 which is situated on the first supporting element 38 at the top left and in which it flows clock-wise to the interconnection 50 situated at the centre of the coil; via this interconnection it reaches the centre of the corresponding first coil 46. In this coil the current again flows clock-wise so as to reach, via the connection element 52a, the first coil 46 situated on the first principal surface of the second supporting element 38 at the top fight. In this coil, and in the corresponding second coil 48, the current flows counter-clockwise. The current flow on the third supporting element 38 is the same as on the first supporting element. After leaving the first coil 46 at the top left on the first principal surface of the last supporting element 38, the current flows, via the extreme right further interconnection 56 and a connection track 52, to the second coil 48 which is situated at the bottom right on the second principal surface of the support and which is traversed clock-wise, like the corresponding second coil. Subsequently, the current successively flows counter-clockwise through the first and the second coils at the bottom left on the second supporting element 38 and clock-wise through the second and first coils at the bottom fight on the first supporting element. Subsequently, the current flows to the second terminal of the supply source, via a point which is indicated by the reference u' and is situated on the connection track 52 at the left on the first principal surface of the connection portion 54. Analogously, the current for the second phase flows from the point v to the point v' and that for the third phase from the point w to the point w'.

A stator part 17 or 18 is formed by folding the strip-shaped support 34 along the folding lines 36 in such a manner that the supporting elements 38 are situated one on the other, thus forming a stack. Folding preferably takes place in a zigzag fashion as diagrammatically shown in FIG. 4b. The second supporting element 38 is then arranged upside down on the first supporting element, whereas the third supporting element has the same orientation as the first supporting element. As a result of the turning over of the second supporting element 38, the coils which are situated on this supporting element at the bottom left in FIG. 3 will be situated above the coils situated on the first supporting element at the top left. Similarly, the coils situated at the top right on the first supporting element 38 will be situated above the coils situated at the bottom right on the first supporting element. Moreover, due to the turning upside down, the current direction in the coils on the second supporting element 38 is reversed so that, viewed from the top of the stack of supporting elements formed, it flows clock-wise. Corresponding coils in the stator part 17 or 18 thus formed, therefore, have the same position and the same current direction, so that the magnetic fields generated in these coils intensify one another. The same holds for the other two phases. If the support 34 comprises more than three supporting elements 38, the current direction and the orientation of all supporting elements having an even sequence number correspond to those of the second supporting element and those of all supporting elements having an odd sequence number correspond to those of the first supporting element.

The foregoing illustrates that two connections of each phase are accessible. Externally a selection can still be made as regards the method of connecting the phases. This may be, for example in the form of a star, in which case the three points u', v' and W' are interconnected. Moreover, the same phases of two stator parts 17 and 18 can be connected in series for a two-sided motor as shown in the FIGS. 1 and 2. When a star connection is chosen, the connection between u', v' and w' can be included in the pattern of conductor tracks 44 and be routed, by means of an interconnection (not shown), to the second principal surface of the support for simple connection to an external power supply apparatus or to a next stator part. In that case it is advantageous that the star point is situated directly below or adjacent the phase connections.

FIG. 3 clearly shows that the conductor tracks 44 situated on the same principal surface of the support 34 extend in a pattern which is the same for all supporting elements 38. This offers the advantage that the formation of the conductor pattern requires only the production of one mask pattern for the first principal surface of a supporting element and one mask pattern for the second principal surface thereof. The photomask for one of the principal surfaces of the support 34 then consists simply of a pattern in which the mask pattern for the corresponding principal surface of a supporting element 38 has been repeated a number of times. The manufacture of the necessary masks is, therefore, comparatively simple and inexpensive. A further simplification is achieved by making the patterns on the two principal surfaces of the support 34 identical. As has already been stated, FIG. 3a shows the first principal surface as viewed from the second principal surface. This means that the pattern of conductor tracks 44 on the first principal surface is the mirror image of the pattern as seen when looking at the second principal surface. Examination of the FIGS. 3a and 3b immediately reveals that the pattern shown in FIG. 3a is the mirror image of the pattern shown in FIG. 3b. It follows therefrom that only one mask pattern need be designed for the manufacture of the photomasks.

Figure 4A:
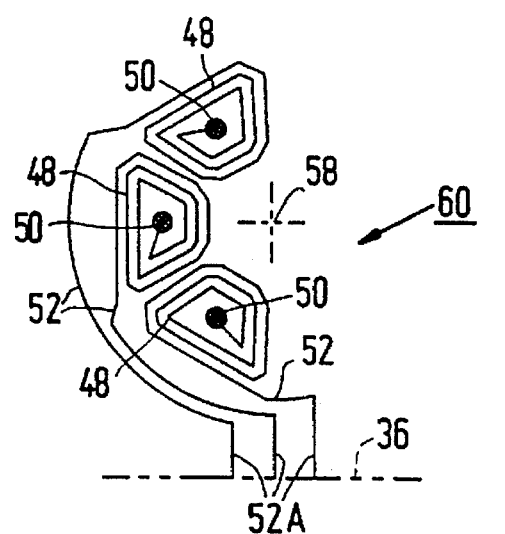
FIGS. 4a and 4b show a basic pattern for the conductor tracks of the support shown in FIG. 3 and a diagrammatic side elevation of a stack of supporting elements, respectively, obtained after the folding of this support.
Figure 4B:
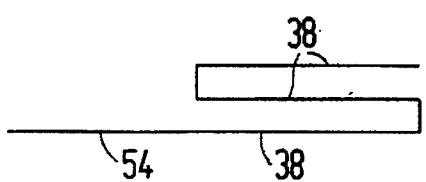

FIGS. 3a and 3b also show that the coils 46, 48 are arranged in a circle whose centre is denoted by the reference 58. After the mounting of the stator parts 17 and 18 in the drive unit 11 (FIGS. 1 and 2), this centre is situated on the axis of rotation 10. In the embodiment shown, each principal surface comprises six coils 46 or 48 which are distributed among three phases, i.e. two coils per phase. The pattern of conductor tracks 44 is chosen so that three coils 46 or 48 which are adjacently situated on the circle and belong to different phases constitute, in conjunction with the associated connection tracks 52, a basic pattern which occurs as many times on each principal surface as there are coils per phase. This basic pattern 60 is shown in FIG. 4a. Comparison of the FIGS. 3a and 3b with FIG. 4a immediately reveals that the mask for the manufacture of the track pattern of each of the principal surfaces of the support 34 can be obtained by way of a number of rotations and translations of the basic pattern 60. The mask designer, therefore, need only design the basic pattern after which the entire mask can be derived therefrom in an extremely simple manner. This saves time and money. In the embodiment shown, the number of coils per phase (N) equals two and the number of phases (M) equals three. Therefore, each basic pattern 60 comprises three coils and N basic patterns occur on each principal surface of a support. Each basic pattern 60 extends across half the circumference of the circle formed by the coils and the two basic patterns on each principal surface are rotated through 180° relative to one another. Generally speaking, it may be stated that for a motor having M phases and N coils per phase, M coils are provided per basic pattern and that each basic pattern extends across 1/N part of the circle circumference and is rotated through 360°/N around the axis of rotation 10, i.e. the centre 58 of the circle, relative to the adjacent basic pattern. Each principal surface thus contains N basic patterns which together constitute a full circle.

Figure 5A:
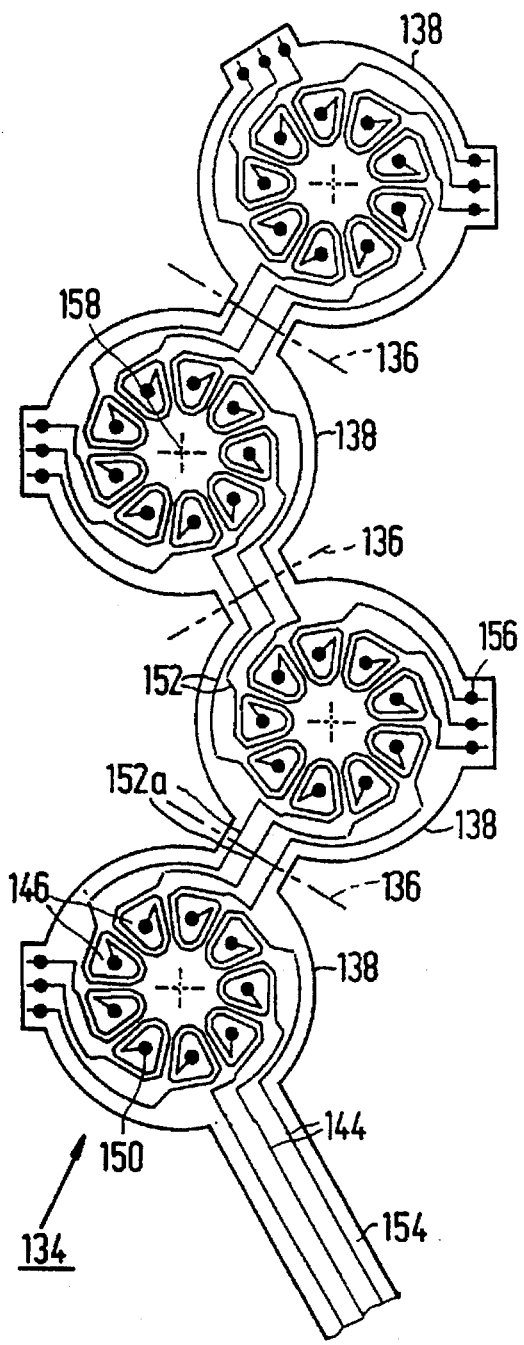
FIGS. 5a and 5b show, analogously to the FIGS. 3a and 3b, a support for a second embodiment of an electric motor in accordance with the invention.
Figure 5B:
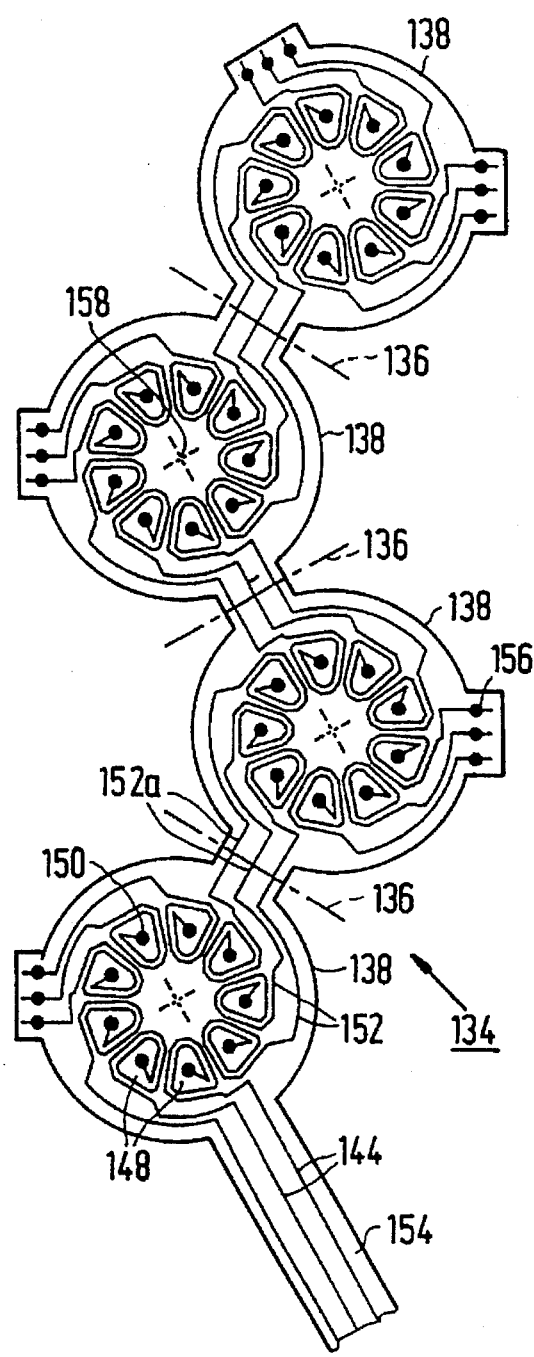

FIGS. 5a and 5b show a second embodiment of a support 134 with the supporting elements 138 of a stator part 17 or 18, separated by folding lines 136 which extend transversely of the local longitudinal direction of the strip-shaped support. On the principal surfaces of the support 134 there are again provided conductor tracks 144 which constitute, on the principal surfaces of the supporting elements 138, patterns comprising first and second coils 146 and 148, respectively, and connection tracks 152 with parts 152a which cross the folding lines 136 and constitute connection elements. Corresponding first and second coils 146 and 148 are also interconnected in this embodiment by means of interconnections 150 provided at the centre of each coil. Further interconnections 156 constitute, whenever necessary, electrical connections between connection tracks 152 on both sides of a supporting element.

The embodiment shown in FIG. 5 involves three phases and three coils per phase. The patterns of conductor tracks 144 on each principal surface of a support are composed of a basic pattern 160 as shown in FIG. 6a. The basic pattern 160 comprises three coils 148 which extend over ⅓ of a circle circumference (120°), the centre 158 of the circle being coincident with the axis of rotation 10 again after mounting. Each basic pattern 160 has been rotated through an angle of 120° relative to the adjacent basic pattern. As a result, the two groups of connection elements 152a associated with a supporting element 138 enclose an angle of 120° relative to one another. Consequently, the support 134 is shaped as a zigzag strip whose longitudinal direction is not the same for all parts. Successive folding lines 136, extending transversely of the longitudinal direction of the strip at the area of the connection elements 152a, thus enclose angles of 120° relative to one another. A further consequence of the rotation of the basic pattern 160 through an angle 120° consists in that the patterns of conductor tracks on the two principal surfaces of the support 134, viewed from the second principal surface as shown in FIG. 5b, are not the mirror image of one another as was the case for the support 34 shown in FIG. 3. For the formation of the conductor tracks on the two principal surfaces, therefore, again two photomasks which are both composed of the same basic pattern are required for this embodiment.

In order to form a stator part 17 or 18, the support 134 is preferably again folded in zigzag fashion as is shown in FIG. 6b. Other methods of folding are also possible, for example first folding the second and third supporting elements 138 onto one another according to the central folding line 136, followed by the folding back of the first and fourth supporting elements. The method indicated in FIG. 6b, however, is to be preferred.

The basic patterns 60 and 160 shown in the FIGS. 4a and 6a for the manufacture of the patterns of conductor tracks on the principal surfaces of the supporting elements 38 and 138, respectively, can be readily replaced by other patterns. Many embodiments are feasible, some of which are shown in the FIGS. 7 and 8. The basic patterns 60 shown are intended to replace the basic pattern shown in FIG. 4a. The basic patterns shown in FIG. 6a can similarly be replaced by other basic patterns.

In the example of a basic pattern 60 as shown in FIG. 7a the connection tracks 52 extend mainly within the circle formed by the coils 48, i.e. between the coils and the centre 58. This offers the advantage that the connection tracks 52 may be comparatively short, so that the electrical resistance of these tracks is comparatively low. A drawback consists in that a clearance must remain between the coils 48 for the connection tracks 52 extending inwards from outside of the circle. This requires an additional space amounting to from two to three track widths.

In the embodiment shown in FIG. 7b one of the connection tracks 52 extends outside the circle and another one extends within the circle. This embodiment, therefore, combines a part of the advantage and a part of the drawbacks of the embodiment shown in FIG. 7a.

FIG. 8a shows an embodiment in which the connection tracks 52 between the coils 48 on a principal surface extend partly across the other principal surface. As a result, only one track width is required outside the circle of coils 48, so that the connection tracks 52 occupy comparatively little surface area. However, the connection tracks comprise additional interconnections 50a, so that the cost price may be higher.

FIG. 8b shows an embodiment in which all connection tracks 52 extend outside the circle of coils 48 as in FIG. 4a. In this case the connection tracks 52, however, extend along a curved line having a direction of curvature which opposes that of the conductor tracks in the associated coil 48: starting from the connection elements 52a the connection tracks curve to the right and the conductor tracks in the coils curve to the left. The advantage thereof consists in that each coil at the outer side of the circle has one tangential conductor track less than in the embodiment shown in FIG. 4a. Therefore, the electrical resistance of the coil is lower whereas the couple generated by the coil is not lower, because only the radially extending conductor tracks contribute to this couple.

A further difference between the embodiments shown in the FIGS. 4a and 8b consists in that in the latter embodiment the three coils 48 are electrically interconnected by means of an additional conductor pattern 62. This is because in many cases it is desirable to re-inforce the pattern of etched conductor tracks 44 by electroplating. This may be important notably to reduce the electrical resistance of the conductor tracks. For such reinforcement by electroplating all parts of the pattern of conductor tracks must electrically contact a terminal 64 situated at the edge of the foil. However, this is not simply possible because, as can be readily deduced from the FIGS. 3 and 5, some conductor tracks 44 are fully enclosed by other conductor tracks. The additional conductor pattern 62 ensures that all conductor tracks 44 are electrically connected to one another, and hence also to the terminal 64, during the electroplating process. After completion of this process, the additional conductor pattern 62 is removed by forming an opening at the centre of the circle of coils, for example by drilling, punching or cutting. Such an opening is required any way to create space for the bearings 31, 32. Evidently, the additional conductor pattern 62 can also be used in other embodiments of the basic pattern 60. The same holds for the muting of the connection tracks and the conductor tracks in the coils according in different directions of curvature.

Like in the embodiments shown, the coils within a basic pattern may be identical, but need not necessarily be so. It is not necessary either for the components for the first principal surface of the support to be identical to those for the second principal surface. The only requirement to be imposed consists in that the coils on a stator part 17 or 18 must constitute a continuous system, i.e. all coils within a phase must be interconnected and hence constitute one winding. Therefore, embodiments as described thus far, are to be preferred because the basic patterns for the two principal surfaces are identical so that the mask design is extremely simple and very symmetrical.

FIG. 9 shows an example of an embodiment in which the patterns of conductor tracks for the two principal surfaces of the support are not composed of identical basic patterns. The Figure is a very diagrammatic representation only and shows merely the course of the patterns of conductor tracks for the two principal surfaces of two supporting elements. Evidently, these patterns can be repeated an arbitrary number of times. FIG. 9a again shows a mirror image of the first principal surface, i.e. viewed from the second principal surface which is shown in FIG. 9b. The first and second coils 246 and 248 are not shown in detail. In principle they have the same shape as the coils shown in the FIGS. 3 and 5, be it that on each principal surface the conductor tracks of some coils extend according to a counter-clockwise spiral and those of other coils according to a clock-wise spiral. In the FIGS. 9a and 9b the direction of the spiral in each coil 246, 248 is denoted by the reference cw or ccw, where cw indicates that the conductor track extends clock-wise from the centre (the interconnection, not shown) to the outside, and ccw indicates that the conductor track extends counter-clockwise. FIG. 9b clearly shows that the connection conductors 252 on the second principal surface may be very short and require hardly any additional space. The connection conductors 252 on the first principal surface, however, are comparatively long and require two track widths on the outer side of the circle of coils 246. Moreover, the pattern of the second principal surface is not regular. The folding lines are denoted by the reference 236 in the Figure and the connection elements by the reference 252a.

Many alternatives are feasible for the described embodiments. For example, an arbitrary number of phases can be chosen and also an arbitrary number of coils per phase. The number of supporting elements per support can also be changed as desired. The stator may be composed of a single stack of supporting elements, or of more than one stack as in the motor shown in the FIGS. 1 and 2.

We claim:

1. A flat electric motor having a rotor (14) with at least one flat, permanent magnetic disc (15) which is rotatable about an axis of rotation (10) extending perpendicularly to the plane of the disc, and an electromagnetic stator (16) which comprises:

at least one stack of flat, electrically insulating supporting elements (38) each having a first and a second principal surface;

patterns of conductor tracks (44) on each of said surfaces which form a plurality of windings consisting of first coils (46) and second coils (48) arranged in a ring about said axis of rotation, each coil consisting of a pattern of spirally extending conductor tracks on each of the first and second principal surfaces of each supporting element;

the coils which form part of each winding being electrically connected in series via a connection system comprising connection tracks (52) which form part of the conductor tracks, interconnections (50, 56) which extend between the first and second principal surfaces, and connection elements (52a) which connect connection tracks of different supporting elements of the stack to one another;

the windings of the stack being distributed between a number of phases each of which comprises one winding, the coils which are situated directly over one another in the stack belonging to the same phase;

the supporting elements (38) of each stack being constituted by successive parts of a stator support (34) in the form of a strip of electrically insulating foil, there being a folding line (36) extending transversely of a local longitudinal direction of the strip between each pair of successive supporting elements, the strip being folded along the folding lines so as to form said stack of supporting elements;

said connection elements (52a) between the connection tracks (52) of different supporting elements of said stack being constituted by portions of said connection tracks which cross the folding lines of said strip.

2. An electric motor as claimed in claim 1, wherein the conductor tracks (44) which are situated on the same principal surface of the stator support (34) extend in a pattern which is the same for all supporting elements (38).

3. An electric motor as claimed in claim 2, wherein the connection track (52) of at least one of the coils (48) extends as a curved line having a curvature which is a concave in a direction towards said axis of rotation (10).

4. An electric motor as claimed in claim 2, wherein the pattern of conductor tracks (44) on each of the principal surfaces of each supporting element (38) is composed of a basic pattern (60) comprising a number of coils (48) which corresponds to the number of phases, each coil being connected to a connection track (52) and a part of a connection element (52a), which basic pattern occurs N times on the principal surface, where N is the number of coils per phase, and each basic pattern extends through 1/N part of the circle circumference and is rotated about the axis of rotation (10) through an angle of 360°/N relative to the adjacent basic pattern.

5. An electric motor as claimed in claim 4, wherein the connection track (52) of at least one of the coils (48) extends as a curved line having a curvature which is a concave in a direction towards said axis of rotation (10).

6. An electric motor as claimed in claim 2, wherein the patterns of the conductor tracks (44) on both principal surfaces of each supporting element (38) are identical.

7. An electric motor as claimed in claim 6, wherein the pattern of conductor tracks (44) on each of the principal surfaces of each supporting element (38) is composed of a basic pattern (60) comprising a number of coils (48) which corresponds to the number of phases, each coil being connected to a connection track (52) and a part of a connection element (52a), which basic pattern occurs N times on the principal surface, where N is the number of coils per phase, and each basic pattern extends through 1/N part of the circle circumference and is rotated about the axis of rotation (10) through an angle of 360°/N relative to the adjacent basic pattern.

8. An electric motor as claimed in claim 7, wherein: in said basic pattern (60) a first part of the connection track (52) of at lease one of the coils (48) is situated on the same principal surface of a supporting element (38) as the relevant coil, a second part of said connection track being situated on the other principal surface of said supporting element; and said first and second parts of said connection track are interconnected by additional interconnections (50a).

* * * * *